(12) United States Patent
Crowe (10) Patent No.: US 7,043,865 B1
(45) Date of Patent: May 16, 2006

(54) WILD GAME ATTRACTION DEVICE AND METHOD

(75) Inventor: Claude M. Crowe, Sterlington, LA (US)

(73) Assignee: Huntwise, Inc., Monroe, LA (US)

( * ) Notice: Subject to any disclaimer, the term of this patent is extended or adjusted under 35 U.S.C. 154(b) by 0 days.

(21) Appl. No.: 10/266,898

(22) Filed: Oct. 8, 2002

(51) Int. Cl.
*A01M 31/06* (2006.01)

(52) U.S. Cl. .............................................. 43/3
(58) Field of Classification Search ............ 43/2, 43/3, 26.1
See application file for complete search history.

(56) References Cited

U.S. PATENT DOCUMENTS

| | | | | |
|---|---|---|---|---|
| 261,910 | A * | 8/1882 | Cochel | 43/3 |
| 843,588 | A * | 2/1907 | Ditto | 43/3 |
| 970,003 | A * | 9/1910 | Wethall | 43/3 |
| 2,246,574 | A * | 6/1941 | Coe | 43/3 |
| 2,547,286 | A * | 4/1951 | Sabin | 43/3 |
| 2,616,200 | A | 11/1952 | Milam | |
| 2,624,144 | A | 1/1953 | Beverman | |
| 2,726,469 | A | 12/1955 | Becker | |
| 2,793,456 | A * | 5/1957 | Argo | 43/3 |
| 4,120,110 | A * | 10/1978 | Aeschliman | 43/3 |
| 4,375,337 | A * | 3/1983 | Yerger | 366/343 |
| 4,422,257 | A | 12/1983 | McCrory | |
| 4,535,560 | A * | 8/1985 | O'Neil | 43/3 |
| 5,074,071 | A | 12/1991 | Dunne | |
| 6,079,140 | A | 6/2000 | Brock | |
| 6,138,396 | A | 10/2000 | Capps | |
| 6,430,863 | B1 * | 8/2002 | Krag | 43/3 |
| 6,442,885 | B1 * | 9/2002 | Payne | 43/3 |

* cited by examiner

*Primary Examiner*—Kurt Rowan
(74) *Attorney, Agent, or Firm*—Kean, Miller, Hawthorne, D'Armond, McCowan & Jarman, LLP (57) ABSTRACT

A floating decoy system is provided for agitating the surface of a water body on which the device is deployed in a manner that is attractive to live game animals (e.g. live waterfowl). The system includes a frame, which is disposed partially above and partially below the surface of the water and suspended from a plurality of floating means. The device also includes an agitator assembly, which is slidably mounted to the frame above the surface of the water and produces ripples on the water surface and the sound of splashing water. The ripples and sound of splashing water are intended to simulate an active area where wild game are swimming, feeding, and interacting. Additionally, an airborne decoy may be mounted atop the frame to give the device added attractiveness to wild game. An alternative embodiment requires the removal of floating means and the anchoring of the frame to the bottom of the water body. The invention further includes a method for attracting live game animals to a target area by agitating the surface of a water body in a manner that simulates the appearance and sound of swimming, feeding, bathing, and commingling live game.

1 Claim, 5 Drawing Sheets

WILD GAME ATTRACTION DEVICE AND METHOD

CROSS-REFERENCE TO RELATED APPLICATION

Not applicable.

BACKGROUND OF THE INVENTION

1. Field of the Invention

This invention relates, generally, to wild game decoys, and in particular to motorized systems which simulate and attract wild game by agitating the water surface and by indirectly animating decoys in a decoy spread.

2. Description of Related Art

Outdoor enthusiasts and recreational hunters have long recognized that live game, and particularly live waterfowl, are attracted to areas that appear to be inhabited by similar animals. For this reason, hunters have used decoys to attract live game to within shooting distance of a hunter's rifle or shotgun. However, in order to attract live game animals to within the proper distance, the decoy must adequately reproduce the appearance, movement, and sound of the animal that they are designed to simulate.

Most waterfowl spend significant amounts of time swimming, feeding, resting, sleeping, bathing, and co-mingling with like species, all of which occur on various bodies of water and cause considerable disturbance of the water surface. These natural waterfowl activities also create sounds associated with the disturbance of the water surface. Therefore, most decoy systems are designed to emulate both the movements and sounds of live waterfowl.

Past attempts to attract waterfowl to a particular hunting area have proven ineffective due to the exceptionally sharp hearing and eyesight of game birds. The very first decoys appealed only to the visual senses of the waterfowl, as they were merely "static" imitations of a live bird and did not provide any means by which the decoy could be moved or produce life-like sounds.

A number of inventions have been developed over the years to deploy static decoy spreads. For example, U.S. Pat. Nos. 2,616,200, 2,624,144, and 5,074,071 generally teach devices for deploying a plurality of decoys using a completely submerged frame that is suspended beneath and coupled to each of the plurality of decoys. The disadvantage of each of the above systems is that none provide a means for moving the decoys, nor do any of them appeal to the waterfowl's auditory sense.

While other decoy systems have attempted to overcome the shortcomings of the above static decoy spreaders by imparting motion to a set of floating decoys, most have shortcomings of their own. For example, U.S. Pat. No. 2,726,469 to Becker discloses a remotely actuated mechanical decoy device comprising a heavy metal frame that is suspended a short distance beneath the water surface using an inflatable float-ring, which is preferably fashioned from rubber or like material. The device is operated by a shoreside hunter, who turns a hand crank, which rotates a long flexible shaft connected to a vertical shaft. The circular rotation of the vertical shaft causes floating decoys to swim in a circle on the water surface. Although Becker accomplishes the movement of duck decoys from a remote hunting location, the device is heavy, difficult to assemble in the field, lacks realistic waterfowl movement, and does not create any splashing or noise comparable to live waterfowl movement.

U.S. Pat. No. 4,375,337 to McCrory discloses a carrousel waterfowl decoy system comprised of a control decoy element fitted with a motor that drives a shaft extension rod. The shaft extension rod projects vertically through the top of the decoy's back, where it is coupled to a plurality of horizontally arranged suspension rods, which rotate in a circle and drag auxiliary decoys in a circular pattern about the control decoy. Like Becker, the McCrory device is difficult to transport and/or assemble and lacks realistic waterfowl movement. More importantly, McCrory, like Becker, does not create splashing or rippling on the water surface in amounts sufficient to convince live waterfowl that the hunting area is safe for landing or occupation.

U.S. Pat. No. 4,375,337 to Yerger discloses an underwater device for ruffling still water, comprising a completely submerged propeller and waterproof housing. The propeller spins in a direction parallel to the water surface and thereby creates ripples on the water surface. The device is intended to animate a spread of decoys deployed in the vicinity of the device.

Yerger has some notable disadvantages. In particular, the Yerger device only allows the user to adjust the amount and degree of ripples by changing the length or position of the stake or anchor cord. Additionally, because the motor remains completely submerged, the device will not likely create the proper amount and type of noise needed to attract waterfowl. Furthermore, the user of the Yerger ruffling system will likely find it difficult to achieve the desired amount of movement of the surrounding decoys, which are deployed independently of the device. Finally, the Yerger device is difficult to deploy and retrieve due to its underwater orientation and because the length of the stake or anchor cord must be reconfigured each time the device is relocated to another section of the pond.

The most important drawback of Yerger is that it uses an underwater motor, which is commonly known by those of skill in the art to be susceptible of performance problems and require continual maintenance and adjustment. Additionally, the device would be difficult to locate if it were to break down while underwater.

U.S. Pat. No. 6,138,396 to Capps discloses a waterfowl decoy towing system comprising a plurality of submerged pulleys, each of which engages a flexible line and is attached to a pipe firmly driven into the water bottom. A plurality of decoys are attached to the flexible line via decoy tethers. A capstan engages a series of pulleys, thereby driving the flexible line about the circuitous route and pulling the plurality of decoys in tow.

The obvious disadvantage of using the Capps device is that it is not portable. In fact, once the Capps decoy "racetrack" is installed in a given pond, it will unlikely ever be moved. The device is not easily installed or repaired when the water is high, and therefore the user must install or repair the device when the water level in the pond is very low. Additionally, the only noise associated with the device is that associated with the turning of the pulleys and the movement of the decoys through the water, neither of which simulates the sound of ducks feeding or commingling.

U.S. Pat. No. 6,079,140 to Brock discloses a motion system for decoys comprising a frame suspended beneath the surface. The frame is suspended from a plurality of floating decoys by a guide wire or string, one end of which is tied to the front of each decoy and the other of which is tied to the frame. Also attached to the frame is a vertically mounted motor with the propellor oriented towards and parallel with the water surface. When activated, the motor drives the frame in a downward direction, thereby dragging the front portion of the decoys beneath the water surface to simulate a waterfowl in the feeding position.

The principal disadvantage of Brock is that the device operates using an underwater motor. Underwater motors such as those used in Yerger and Brock are expensive to purchase and require routine maintenance due to the corrosion caused by long periods of submersion. Additionally, the Brock device is not capable of maintaining a continuous splashing and rippling action on the surface of the water, because once the Brock motor is activated, the frame is pushed away from the water surface and down towards the bottom of the water body. Furthermore, the character and amount of ripples and splashing cannot be controlled using the Brock device because it is difficult to alter the distance between the underwater motor and the water surface once the decoy system is deployed.

As can be seen from the above discussion, the prior art has largely failed to capitalize on the visual and auditory stimuli of a flying waterfowl and has failed to develop a decoy system that is inexpensive, yet durable under ordinary hunting conditions. Therefore, what is needed is a device that overcomes the shortfalls of the devices that are currently known in the art. Specifically, what is needed is a device and method that properly cater to both the visual and auditory senses of live waterfowl by providing animated waterfowl movement and realistic waterfowl sound.

OBJECTS OF THE INVENTION

It is an object of the present invention to provide a device for simulating the movement and sound of live waterfowl.

Another object of the present invention is to provide a device for agitating the surface of the water body on which the device is deployed, in a manner that simulates the appearance and sound of swimming, feeding, bathing, and commingling live waterfowl.

Another object of the present invention is to provide a device for agitating the surface of the water body on which the device is deployed, wherein the character and amount of water surface agitation may be varied.

Another object of the present invention is to provide a device for agitating the surface of the water body on which the device is deployed, wherein the agitating device is supported by a frame disposed partially above and partially below the water surface.

Another object of the present invention is to provide a device for agitating the surface of the water body on which the device is deployed, wherein the bottom legs of the frame are suspended beneath a waterfowl decoy or other floating object.

Another object of the present invention is to provide a device for agitating the surface of the water body on which the device is deployed, wherein the legs of the frame may be folded towards the frame for ease of transport.

Another object of the present invention is to provide a device for agitating the surface of the water body on which the device is deployed, wherein the device is lightweight and easily deployed in the field.

Another object of the present invention is to provide a device for agitating the surface of the water body on which the device is deployed, wherein the device is durable and holds up well under the rigors presented by ordinary hunting conditions.

Another object of the present invention is to provide a device for agitating the surface of the water body on which the device is deployed, wherein the top of the frame is designed to accommodate a motorized decoy.

Another object of the present invention is to provide a device for agitating the surface of the water body on which the device is deployed, wherein the agitating device may be actuated by a remote control mechanism, which may be a multi-cycle remote control.

SUMMARY OF THE INVENTION

A floating decoy system is provided for agitating the surface of a water body on which the device is deployed, in a manner that simulates the appearance and sound of swimming, feeding, bathing, and commingling live waterfowl. The system includes a frame, which is oriented in a substantially vertical direction and disposed partially above and partially below the surface of the water. The frame is comprised of a vertical member, a substantial portion of which projects above the water surface. The portion of the vertical member that projects below the water surface is further comprised of a plurality of legs, which are capable of being folded vertically upward to a position that is substantially parallel with the vertical member. When folded down into the horizontal position, the legs can be locked in place using a locking means.

The frame may be floated in a body of water by using a floating means, which may include a plurality of floating decoys. The floating means are attached to the distal ends of the legs, which must first be locked in the horizontal position using the aforementioned locking means. In this manner, the leg members and a portion of the vertical member are suspended beneath the water surface and are prevented from sinking by virtue of the floating means.

The portion of the frame above the water surface is further comprised of an agitator assembly, which is mounted on an agitator assembly support. The agitator assembly support is attached by welding or other means to a telescoping member, which fits over or inside the vertical member to allow the position of the agitator assembly to be moved towards or away from the water surface in the vertical direction.

The agitator assembly comprises a battery, a motor, and a downwardly extending agitating means, which may be a blade, a propeller, a screw device, a louvered structure, or any other means suitable for agitating the water surface. In use, the battery powers the motor, which drives the agitating means. In one embodiment, the agitating means rotates in the horizontal direction and contacts the water surface, which produces ripples on the water surface and the sound of splashing water. The ripples and sound of splashing water are intended to simulate an active area where waterfowl are swimming, feeding, and interacting.

An alternative embodiment of the invention includes the addition of an airborne decoy, and preferably a spinning wing, motorized decoy, to the uppermost portion of the telescoping member.

Another embodiment of the invention requires the removal of the radially projecting leg members and floating means and the extension of the vertical member, such that the vertical member can be driven into the water bottom with the agitator assembly above the water surface.

Another embodiment of the invention involves the addition of a modulator or a multi-cycle remote control to the motor whereby the user can modify the duration and frequency of operation in order to provide a more realistic simulation of waterfowl activity.

Another embodiment of the invention includes a land based battery, such as a twelve (12) volt battery, which is directly connected to the motor via hard wire.

Another embodiment of the invention includes a battery that is attached to the vertical member by a battery attachment means.

Another embodiment of the invention includes the addition of a remote control apparatus, whereby the motor may be activated at a distance, for example, by a hunter in a nearby hunting blind.

These and other objects, advantages, and features of this invention will be apparent from the following description.

BRIEF DESCRIPTION OF THE DRAWINGS

FIG. 3b is an additional side view of the agitator assembly and telescoping member as seen from an angle perpendicular to the view presented in FIG. 3a.

DETAILED DESCRIPTION OF THE INVENTION

Figure 1:
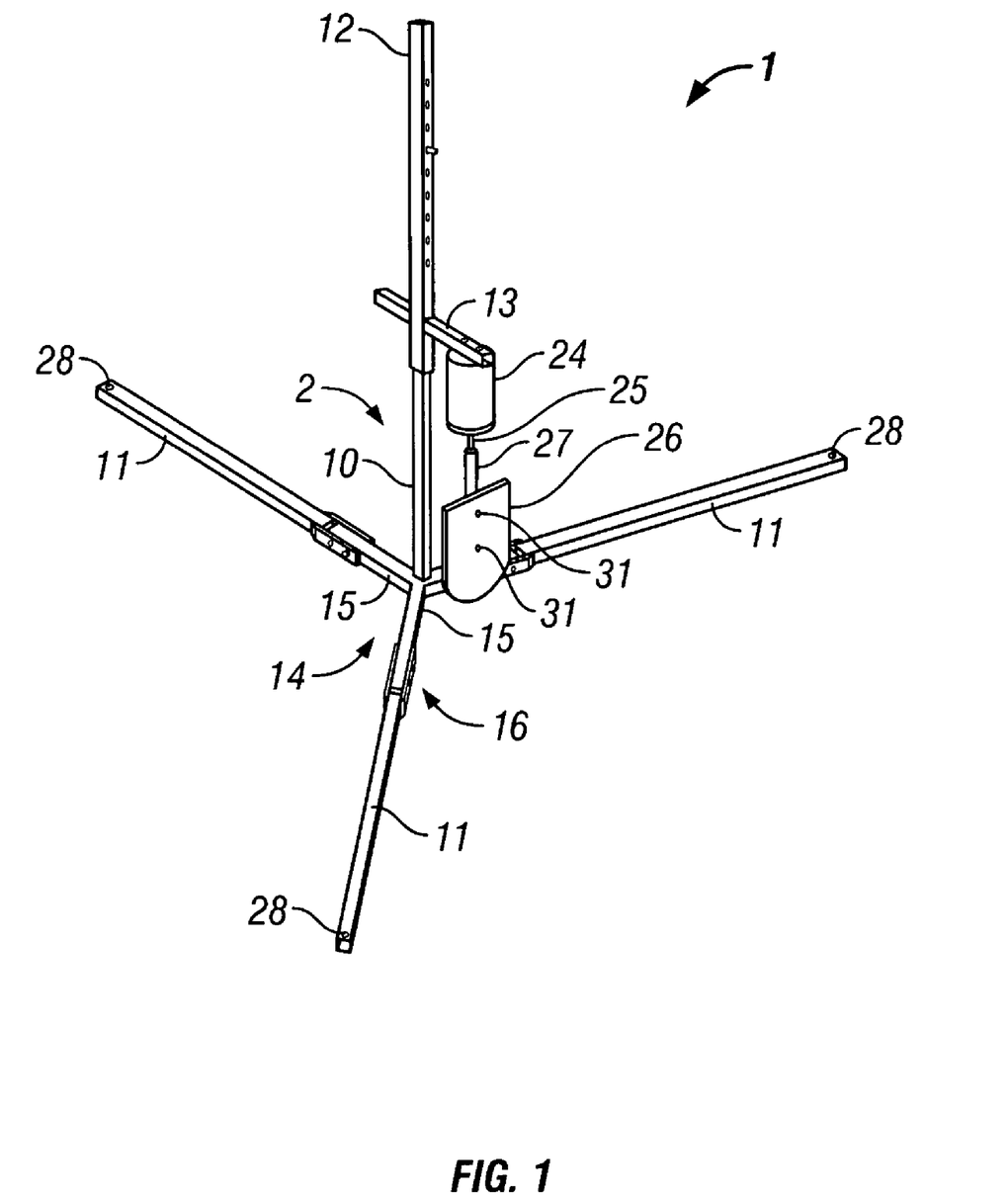
FIG. 1 is a perspective view of the frame and agitator assembly.
Figure 2:
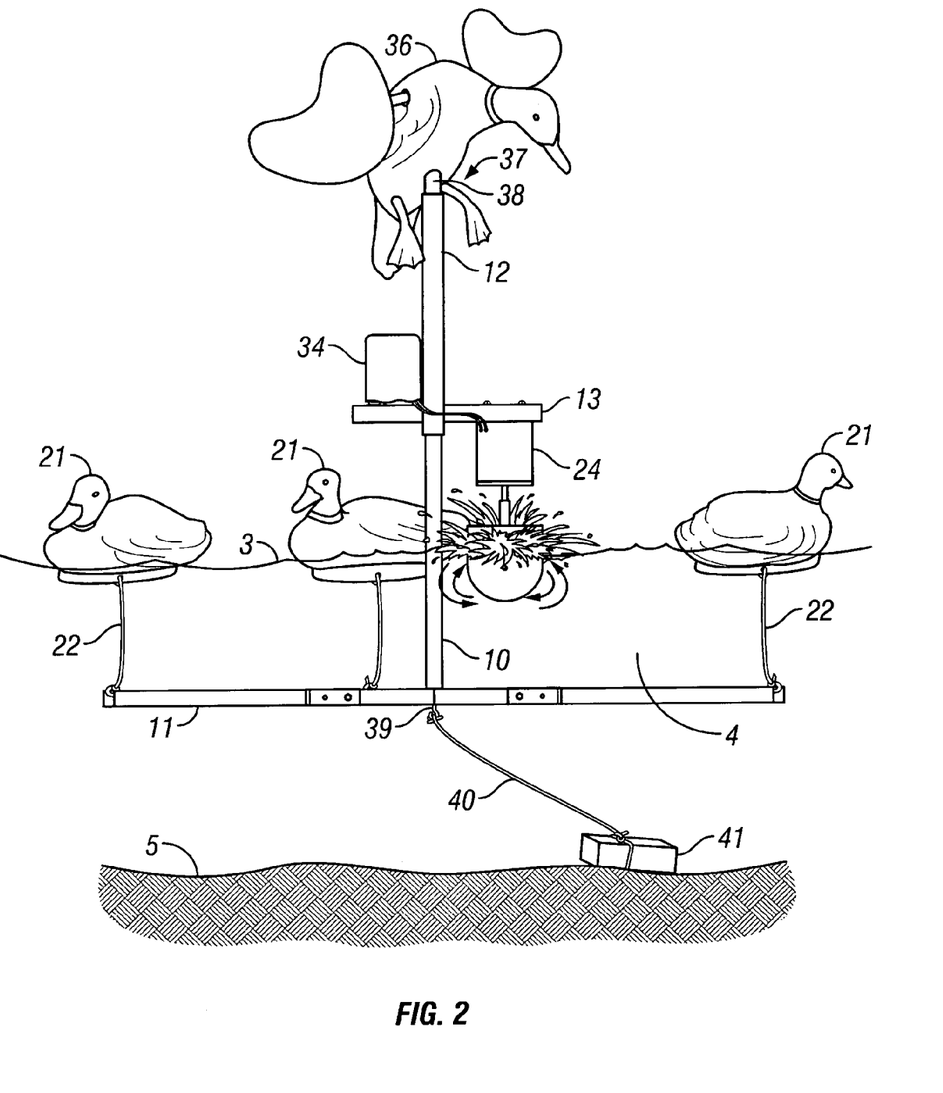
FIG. 2 is a side view of the floating decoy system in operation in a body of water.

With reference to FIGS. 1–4c, a preferred embodiment of the wild game attraction device 1 will now be described. As shown in FIGS. 1 and 2, device 1 comprises a frame 2, which is disposed partially above and partially below water surface 3. Frame 2 is primarily comprised of vertical member 10, legs 11, telescoping member 12, and agitator assembly support 13. The various elements comprising frame 2 may be fashioned from any sufficiently durable material, including, but not limited to, metal, plastic, or wood.

Regardless of the material used to construct frame 2, the comprising members may have various cross sections, including, but not limited to cross sections that are cylindrical, square, rectangular, triangular or angled (such as a piece of angle iron).

Vertical member 10, which is oriented in a substantially vertical direction, may be perpendicularly attached to base structure 14, which is generally formed by welding or molding together the proximal ends of three relatively short, base projections 15. The distal end of each base projection 15 is hingedly connected to legs 11 by virtue of locking means 16.

Figure 3A:
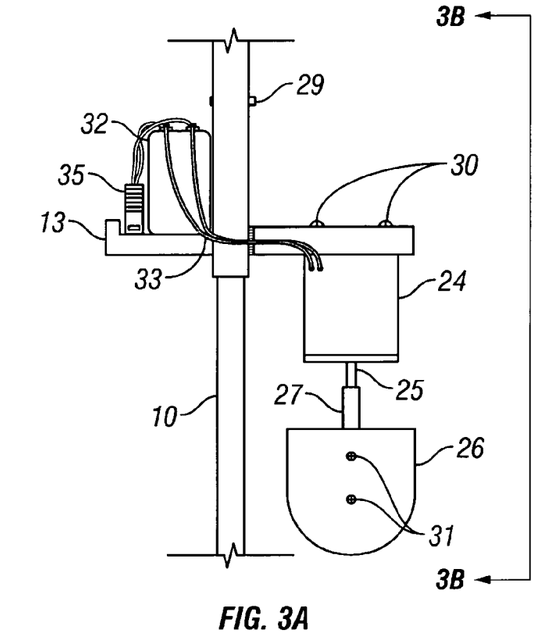
FIG. 3a is a side view of the agitator assembly and telescoping member.
Figure 3B:
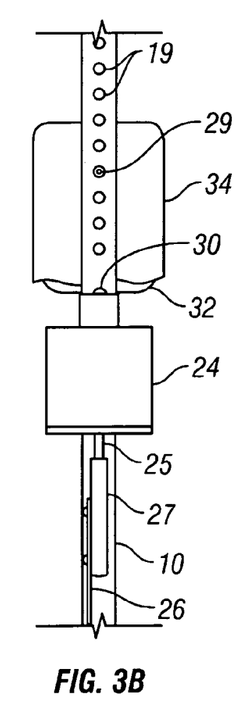
Figure 3C:
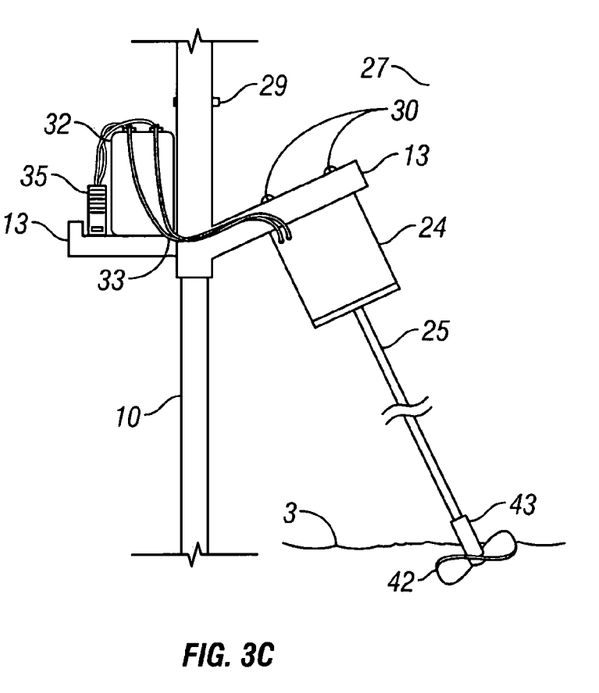
FIG. 3c is a side view of an alternative embodiment of the agitator assembly and telescoping member.

Referring to FIGS. 3a–3c, locking means 16 is preferably comprised of side plates 17, hex bolt 18, apertures 19, and spring retainer pin 20. A total of two (2) side plates 17 are secured near their distal ends to opposite sides of each radially projecting leg 11 by welding or means common to those of ordinary skill in the art. The proximal ends of the two side plates are hingedly connected to the distal ends of each base projection 15 using hex bolt 18 or similar means. Each of side plates 17 contain at least one aperture 19, which is drilled into side plate 17 and adapted to receive spring retainer pin 20.

From the above description and drawings, the operation of locking means 16 may be readily understood. While in transport, legs 11 may be folded upwards and rotated about hex bolt 18 into a position substantially parallel to vertical member 10. Once the hunter has arrived at the hunting destination, legs 11 may be folded downwards and rotated about hex bolt 18 into a position substantially perpendicular to vertical member 10. Legs 11 are locked in the perpendicular position by depressing spring retainer pin 20 and rotating legs 11 with side plates 17 over spring retainer pin 20 until apertures 19 align with spring retainer pin 20. Once the hunter has finished hunting or wishes to move to another hunting location, the hunter simply depresses spring retainer pin 20 and raises legs 11 into the vertical position. In addition to the means described above, locking means 16 may alternatively include removable shear pins, a manual screw configuration, or other means known to those skilled in the art for allowing legs 11 to be locked in a position substantially perpendicular to vertical member 10.

Figure 4A:
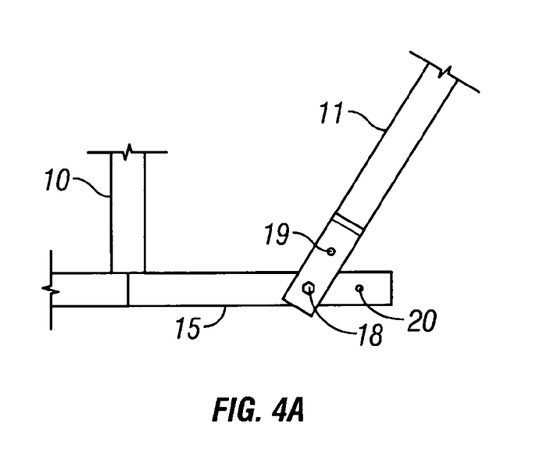
FIG. 4a is a side view of one radially projecting leg in the slightly raised position.
Figure 4B:
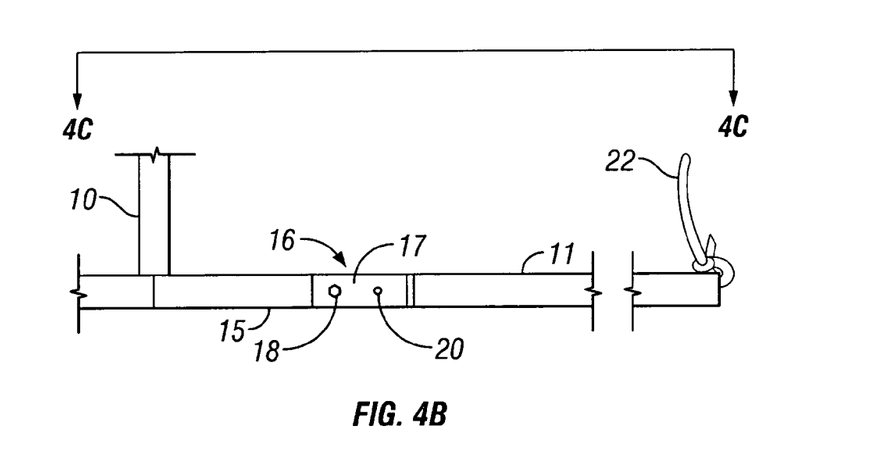
FIG. 4b is another side view of one radially projecting leg in the locked position.
Figure 4C:
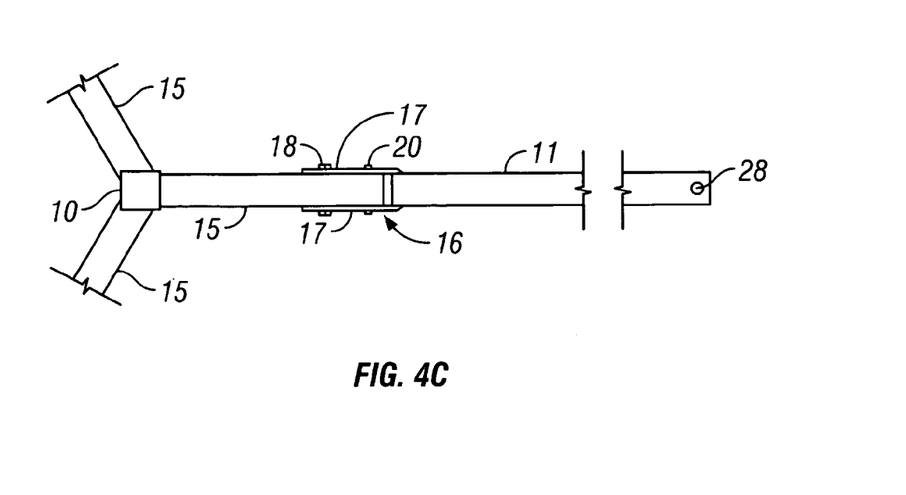
FIG. 4c is a plan view of one radially projecting leg in the locked position.

Once legs 11 are folded down in the "locked" position, the hunter may attach floating means 21, which may be a floating decoy (such as a water fowl decoy), a styrofoam block, a plastic cola bottle, or similar means, to frame 2. Floating means 21 are attached to each of legs 11 using decoy cord 22, a small chain, a dog clip, or other means known to those skilled in the art. A single piece of decoy cord 22 is attached to the bottom of floating means 21 and to the terminal end of radially projecting leg 11 by tying or clipping through orifice 28 as shown in FIGS. 1, 2, and 4a. After floating means 21 have been attached, device 1 may be placed into water 4, with legs 11 completely submerged and suspended beneath floating means 21 and with vertical member 10 projecting partially above and below water surface 3. In order to ensure that device 1 maintains sufficient stability in water 4, each piece of decoy cord 22 should preferably be of uniform length.

Agitator assembly 23 is attached to frame 2 by virtue of agitator assembly support 13 and telescoping member 12. Agitator assembly support 13, which projects a relatively short distance from each of opposing sides of telescoping member 12, is preferably welded to telescoping member 12 near its lower portion. However, other means known to those skilled in the art may also be used to attach agitator assembly support 13 to telescoping member 12, including the use of bolts or molding.

As shown in FIGS. 1, 2, and 3a, telescoping member 12 slides over vertical member 10, to which is attached upper spring retainer pin 20. Similar to side plates 17, telescoping member 12 contains multiple apertures 19, all of which are vertically oriented on telescoping member 12 as shown in FIGS. 1 and 3b. By depressing upper spring retainer pin 29 and sliding telescoping member 20 up or down and releasing upper spring retainer pin 29 into the selected aperture 19, the height of telescoping member 12 and agitator assembly 23 may be varied above water surface 3.

Agitator assembly 23 comprises motor 24, motor shaft 25, agitating means 26, and mount 27. Motor 24 is attached to agitator assembly support 13 at its uppermost surface using suspension bolts 30. Motor shaft 25 projects vertically down and out of the lower end of motor 24. Mount 27, which has a hollow recess of sufficient diameter to accommodate motor shaft 25, slides over and is coupled to motor shaft 25 using a set screw (not shown), thumb screw, or other known means. In the embodiment shown in FIGS. 1, 2, 3a, 3b, and 5, agitating means 26 is a blade that is secured to mount 27 using two phillips screws 31 or similar means and oriented in a direction such that it will rotate in a horizontal plane about motor shaft 25, as shown in FIG. 2.

Although agitating means 26 is depicted in FIGS. 1, 2, 3*a*, 3*b*, and 5 as a flat, paddle-like blade, agitating means 26 may also include one or more propellers, louvers, or other structures capable of agitating water surface 3. Additionally, other embodiments allow motor shaft 25 to be angled with respect to water surface 3. FIG. 3*c* depicts such an alternative embodiment, wherein a portion of agitator assembly support 13 is angled with respect to water surface 3 and motor shaft 25 is extended at an angle perpendicular to agitator assembly support 13 to contact water surface 3. In the embodiment shown, agitating means 26 is a propeller 42 attached to propeller mount 43. This configuration of agitator assembly 23 will allow device 1 to be propelled across water surface 3 while simultaneously tossing water about and simulating the appearance and sound of an active feeding area. If the movement of frame 2 is restricted by lanyard 40 attached to anchor 41, then device 1 will move about in a circular pattern on water surface 3. Those skilled in the art will also realize that it would be obvious to provide a means for varying the angles at which motor shaft 25 and propeller 42 contact water surface 3, including but not limited to an adjustable hinge (not shown) between agitator assembly support 13 and telescoping member 12.

Agitator assembly 23 is powered by battery 32, which may be a land-based six volt (6 v) or twelve volt (12 v) battery (see FIG. 5), a six volt (6 v) or twelve volt (12 v) battery mounted to frame 2 on top of agitator assembly support 13 (see FIGS. 2 and 3*a*), or any alternative means of power. Regardless of the size or location of battery 32, battery 32 delivers power to motor 24 by means of wires 33 appropriately coupled to battery 32 and motor 24. See, e.g., FIGS. 2, 3*a*, and 5.

In the self-contained embodiment of the invention shown in FIGS. 2, 3*a* and 3*b*, battery 32 rests atop agitator assembly support 13, where it is preferably protected from water displaced by agitating means 26 and hidden from approaching waterfowl by slip cover 34, which may be fashioned from camouflaged material. In addition, slip cover may house and/or cover remote control receiver 35 or a modulator (not shown), both of which may provide random and/or intermittent operation of motor 24 and agitating means 26.

Remote control receiver 35 responds to on/off signals from a remote control transmitter (not shown). Remote control receiver 35 may also be a multi-cycle remote control receiver, which enables the user to preselect or program the length of time for which motor 24 is turned on and off. If a modulator is used instead of remote control receiver 35, then the user can also preselect or preprogram the time periods for which motor 24 is turned on and off, but cannot do so from a remote location.

Other features of agitator assembly 23 are disclosed in addition to those described above. For example, the speed with which agitating means 26 rotates during operation of motor 24 may be selectively increased or decreased by the hunter by means known to those of skill in the art. This option offers additional flexibility to the hunter, who may modify the character of agitation to closely mimic the movements and sounds of live waterfowl.

From the aforementioned description and drawings, the manner of operation of device 1 may be understood. Once the hunter arrives at the desired hunting site, the hunter will grasp device 1 by vertical member 10 and deploy legs 11 into the horizontal position as described above. Once legs 11 are properly locked in place, floating means 21 are tied to legs 11 using decoy cord 22 or similar means. Device 1 may then be placed in water 4 and the height of agitator assembly 23 above water surface 3 adjusted to provide the degree and character of splashing that is sufficient to attract live waterfowl.

It will be readily appreciated that a higher position of agitating means 26 relative to water surface 3 will produce more superficial agitation than a lower position of agitating means 26 with respect to water surface 3. Additionally, the sound produced pursuant to said agitation differs depending upon the amount of contact agitating means 26 has with water 4, and the speed with which agitating means 26 turns.

Once the height of agitator assembly 23 has been adjusted, the hunter may then surreptitiously hide himself or herself at a distance away from device 1 (e.g., in a duck blind) and activate motor 24 and consequently agitating means 26 using a remote control transmitter or wires connected to a land-based battery. If a multi-cycle remote control or modulator is used, the hunter may preselect the periods of activation of motor 24. For example, motor 24 may operate according to one or more of the following frequencies: 6 seconds on/16 seconds off, 16 seconds on/6 seconds off, 10 seconds on/20 seconds off, 2 seconds on/20 seconds off. The foregoing frequencies of operation are provided for illustrative purposes only. Other periods of activation of motor 24 can be programmed using the multi-cycle remote control or modulator as desired by the user.

During operation, wind or waves may occasionally cause device 1 to slowly drift about water surface 3. In order to limit the degree of drift, the hunter may attach lanyard 40 to frame 2 by ordinary means such as eye hook 39, which may be attached to the bottom of base structure 14. The other end of lanyard 40 may be tied or otherwise attached to anchor means 41, which is shown in FIG. 2 as a brick. Alternatively, the hunter may wish to simply allow device 1 to meander about the water body depending upon hunting conditions.

In order to add another degree of realism to device 1, airborne decoy 36 may be secured atop telescoping member 12 using attachment means 37 for purposes of emulating a waterfowl descending into or rising from a group of waterborne waterfowl and to further conceal agitator assembly 23 and the upper portions of frame 2. Preferably, airborne decoy 36 is a motorized, spinning wing "flash" decoy as illustrated in FIG. 2. However, airborne decoy 36 may also be any other type of decoy, including a static decoy of the type comprising floating means 21. Attachment means 37 may include projection 38, which extends from airborne decoy 36 in the downward direction and is inserted into the uppermost end of telescoping member 12. Alternatively, attachment means 37 may also include other means commonly known to those of skill in the art for attaching a waterfowl decoy to an extended member.

Figure 5:
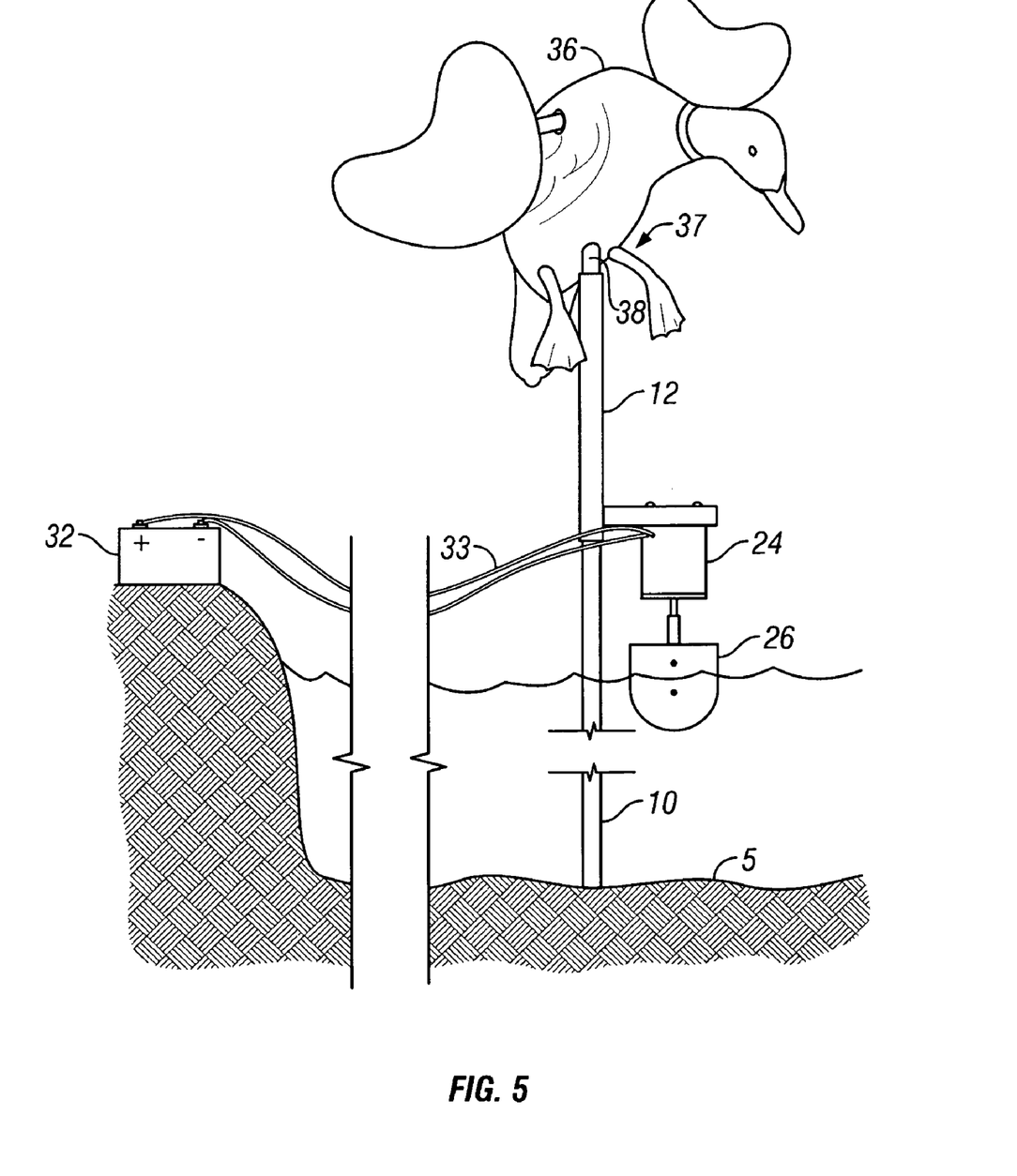
FIG. 5 is a side view of an alternative embodiment of the frame and agitator assembly.

In an alternative embodiment of device 1 represented in FIG. 5, frame 2 is modified to be driven into water bottom 5 in a stake-like manner. This embodiment is accomplished by removing horizontally projecting legs 11, base structure 14, and locking means 16 and sufficiently lengthening vertical member 10 to allow vertical member 10 to be anchored into water bottom 5. This latter embodiment may be used when water 4 is not deep enough to accommodate the floating version of device 1, for greater ease of transport, or when the hunter simply wishes to limit the movement of frame 2 to suit the particular hunting conditions.

Although device 1 is shown and described above primarily in connection with agitator assembly 23, it will also be understood from the description and drawings that a hunter may use the floating version of device 1 without agitator assembly 23 and simply with frame 2, floating means 21 and optionally with airborne decoy 36. In this manner, device 1 serves as a useful decoy spreader which deploys decoys both at the surface of the water and above the surface of the water for a convincing three dimensional effect.

There are, of course, other alternate embodiments that are obvious from the foregoing descriptions of the invention, which are intended to be included within the scope of the invention, as defined by the following claims.

I claim:

1. A device for attracting wild game, said device comprising
   (a) a frame, said frame floating in a waterbody and further comprising
      (i) a vertical member;
      (ii) a plurality of legs, each of said legs having a proximal end and distal end, said proximal ends of said legs being attached to and radially projecting from a base structure, wherein said legs may be folded upwards from a substantially horizontal position into a position substantially parallel to said vertical member, and wherein said legs may be held in said substantially horizontal position and in said substantially parallel position by way of locking means;
      (iii) said base structure being attached to said vertical member, wherein said locking means comprises a plurality of side plates pivotally attached to said base structure and fixedly attached to each of said legs; an aperture in each of said side plates; a plurality of spring retainer pins, said spring retainer pins being fastened to said base structure, wherein each of said legs may be locked in said substantially horizontal position by depressing said spring retainer pin and subsequently releasing said spring retainer pin into said aperture,
   (b) a plurality of floating means, said floating means being attached to said legs;
   (c) an agitator assembly, said agitator assembly adapted to agitate the surface of a water body in a manner attractive to wild game.

* * * * *